Patented Oct. 27, 1953

2,657,166

UNITED STATES PATENT OFFICE 2,657,166

CHLORINATED TERPENE ALCOHOLS, ESTERS, AND ETHERS AS INSECTICIDES

William D. Stonecipher, Newark, Del., assignor to Hercules Powder Company, Wilmington, Del., a corporation of Delaware No Drawing. Application October 7, 1950, Serial No. 189,071

5 Claims. (Cl. 167—30)

This invention relates to an insecticidal composition and more particularly to an insecticidal composition containing a chlorinated cyclic oxyterpene derivative as the toxic ingredient.

Among the more commonly used insecticidal toxicants are the naturally occuring products, pyrethrum, rotenone, and nicotine. These natural products have the very great disadvantage in not being uniform in their insecticidal activity. Many synthetic products have been suggested in the past as substitutes for these toxicants; however, they are usually lacking in one respect or another. Particularly they do not usually have a high enough killing power and must be used in concentrations which cause irritation to the user, or if they are sufficiently toxic, they are also toxic to forms of animal life other than insect pests.

Now in accordance with this invention, it has been found that insecticidal compositions containing as a toxic ingredient a chlorinated cyclic oxyterpene derivative, having a chlorine content of from about 40% to about 70%, possess an unusual degree of insecticidal activity. These chlorinated cyclic oxyterpene derivatives which may be prepared by chlorinating such cyclic oxyterpenes as cyclic terpene acylates, cyclic terpene alcohols, cyclic terpene ethers, cyclic terpene ketones, etc., having a very high killing power, are effective in extremely dilute solutions as insecticidal toxicants.

The following examples will illustrate the preparation of these chlorinated cyclic oxyterpene derivatives and the insecticidal activity of compositions containing them. All parts are parts by weight.

EXAMPLE I

Two parts of isobornyl acetate dissolved in 1 part of carbon tetrachloride was placed in a chlorination vessel and a crystal of iodine was added as a catalyst. Chlorine was passed into the agitated mixture for 4 hours, the temperature rising to 70° C. The material was water washed, dried over sodium sulfate, and the carbon tetrachloride was distilled off under reduced pressure. This material was a yellow liquid which had a chlorine content of 40.1%. It was fractionated under reduced pressure and the two fractions having a chlorine content of 44.7% and 47.8% were tested for their insecticidal activity against houseflies. In this and the following examples, the test for insecticidal activity against houseflies was made in the following manner and is referred to in this specification as the bell jar method.

Approximately 100 five-day old flies (*Musca domestica*) were placed in a bell jar and a predetermined quantity of the insecticide to be tested was atomized into the bell jar. The quantity of insecticide used was equal to the amount of the official test insecticide which was necessary to give a 30–55% kill and must be within the limits of 0.4 to 0.6 ml. After spraying the insecticide into the chamber, the flies were placed in an observation cage containing a wad of cotton wet with a dilute sugar solution. At the end of 24 hours, the number of dead and moribund flies was counted. All tests were carried out at 80°–90° F. and 50–70% relative humidity.

Insecticidal tests were made on 1% solutions of the two chlorinated isobornyl acetates in deodorized kerosene.

*Bell jar tests on flies*

| Percent Chlorine | Percent Dead in 24 Hrs. | O.T.I. Difference |
|---|---|---|
| 44.7 | 84 | +46 |
| 47.8 | 100 | +62 |

The chlorinated isobornyl acetate having a chlorine content of 47.8% chlorine was also tested at a dilution of 0.4% in deodorized kerosene and found to have a kill of 65% which was equal to an O. T. I. difference of +34.

A deodorized kerosene solution containing 0.6% of the chlorinated isobornyl acetate having a chlorine content of 47.8% and 1% of isobornyl thiocyanoacetate had a kill of 95% which was equal to an O. T. I. difference of +64.

The same chlorinated isobornyl acetate (47.8% Cl) was also tested in combination with the official test insecticide. When 0.2% of this material was added to the official test insecticide, a kill of 92% was obtained which corresponded to an increase over the O. T. I. alone of +61.

EXAMPLE II

The chlorinated isobornyl acetate containing 47.8% chlorine, which was described in Example I, was tested for its insecticidal activity against adult male German roaches. In carrying out this test, 10 to 15 roaches were placed in cages and sprayed with deodorized kerosene solutions of the toxicant. A 2.5% and a 5% solution in deodorized kerosene of this material gave a kill which was equal to the O. T. I. A 10% deodorized kerosene solution of the material gave a 100% kill which was equal to an O. T. I. difference of about +30.

EXAMPLE III

One part of isobornyl propionate was dissolved in 1 part of carbon tetrachloride and a small crystal of iodine was added. Chlorine was passed into the solution at about 30° C. for 5 hours, the temperature rising slightly due to the heat of the reaction. The product was water washed and dried. It was a yellow liquid which contained 40.6% chlorine. Deodorized kerosene solutions of this material were tested for their insecticidal activity against houseflies by the bell jar method.

*Bell jar tests on flies*

| Concentrations of Deodorized Kerosene Solutions | Percent Dead in 24 Hrs. | O.T.I. Difference |
|---|---|---|
| 1% | 44 | +20 |
| 2% | 66 | +49 |
| 5% | 90 | +70 |

When tested on German roaches as described in Example II, a 10% solution in deodorized kerosene gave a kill of 100%.

EXAMPLE IV

Chlorinated isobornyl acetates (prepared by chlorinating isobornyl chloroacetate by the chlorination procedure described in Example I) containing 43.3% chlorine and 47.3% chlorine were tested for their insecticidal activity against houseflies by the bell jar method.

*Bell jar tests on flies*

| Percent Chlorine | Concentration of Solution, Percent | Percent Dead in 24 Hrs. | O.T.I. |
|---|---|---|---|
| 43.3 | 1 | 68 | +30 |
|  | 5 | 100 | +56 |
| 47.3 | 1 | 89 | +51 |
|  | 5 | 100 | +56 |

A deodorized kerosene solution containing 1.0% of the chlorinated isobornyl chloroacetate having a chlorine content of 47.3% in combination with 1% of isobornyl thiocyanoacetate had a kill of 98% when tested against houseflies. This same chlorinated material was also tested in combination with the official test insecticide. When 0.5% of this material was added to the O. T. I., a kill of 90% was obtained.

EXAMPLE V

A chlorinated isobornyl acetate prepared by chlorinating isobornyl chloroacetate and a chlorine content of 42.7%. A 1% solution in deodorized kerosene when tested against houseflies by the bell jar method gave an increase in kill over the O. T. I. of 35. When 0.5% of this material was added to the O. T. I., an increase in kill of 34 over the O. T. I. alone was obtained.

This product was also tested against the German roaches as described in Example II. A 10% solution in deodorized kerosene of this chlorinated isobornyl acetate gave a kill of 100%.

EXAMPLE VI

One part of bornyl salicylate was dissolved in 3 parts of chloroform. A small crystal of iodine was added as catalyst and chlorine was bubbled through the solution until the exothermic reaction ceased. The reaction mixture was then diluted with petroleum ether, washed with sodium bicarbonate solution until free of acid and excess chlorine and dried over sodium sulfate. The solvent was removed by distillation under reduced pressure and the product which remained was an orange-colored very viscous liquid which had a chlorine content of 41.8%. A 10% deodorized kerosene solution of this chlorinated bornyl salicylate when tested for its insecticidal activity against houseflies by the bell jar method had a kill of 100% which was equal to an O. T. I. difference of +54.

EXAMPLE VII

One and one-half parts of isoborneol was dissolved in 2 parts of carbon tetrachloride and a small crystal of iodine was added as a catalyst. Chlorine was passed into the solution for 4 hours, the temperature rising to 62° C. and then decreasing as the chlorination proceeded. Diethyl ether was then added to the reaction mixture and the mass was water washed and dried. The solvent was removed by distillation under reduced pressure and a viscous yellow liquid, which had a chlorine content of 40.8%, was obtained.

The chlorinated isoborneol was tested for its insecticidal activity against houseflies by the bell jar method. A 1% solution of this material in deodorized kerosene had a kill of 44% which was equal to an O. T. I. difference of +6.

EXAMPLE VIII

One part of fenchyl alcohol dissolved in 5 parts of carbon tetrachloride was placed in a chlorination vessel and exposed to ultraviolet illumination. Chlorine was passed into the agitated mixture at a rate that allowed for maximum absorption of the chlorine. The chlorination was continued until 4 parts of chlorine had been absorbed. The carbon tetrachloride was removed by distillation under reduced pressure. The chlorinated fenchyl alcohol so obtained was a very viscous yellow liquid having a chlorine content of 61.3%.

This chlorinated fenchyl alcohol was tested for its insecticidal activity against houseflies by the bell jar method. The results obtained on deodorized kerosene solutions of this material are given in the following table:

*Bell jar tests on flies*

| Concentration of Solution | Percent Dead in 24 Hrs. | O. T. I. Difference |
|---|---|---|
| 1% | 65 | +30 |
| 5% | 99 | +41 |
| 10% | 100 | +54 |

A very good knockdown was obtained with the 10% solution of this toxicant.

EXAMPLE IX

One part of β-chloroethyl terpinyl ether dissolved in 5 parts of carbon tetrachloride was chlorinated by passing chlorine into the solution in the presence of ultraviolet light, the temperature being held below 45° C. during the chlorination. After 8 hours of chlorination a portion of the material was removed and the remainder was chlorinated for a total of 24 hours. The carbon tetrachloride was removed from each of the two materials by distillation under reduced pressure. The two chlorinated β-chloroethyl terpinyl ethers so obtained were yellow liquids having a chlorine content of 60.8% and 66.4%, respectively.

These two chlorinated β-chloroethyl terpinyl ethers were tested for their insecticidal activity against houseflies by the bell jar method. The following results were obtained on 5% solutions of these materials in a solvent made up of 80% deodorized kerosene and 20% acetone:

| Percent Chlorine | Percent Dead in 24 Hrs. | O. T. I. Difference |
|---|---|---|
| 60.8 | 100 | +56 |
| 66.4 | 100 | +56 |

The chlorinated cyclic oxyterpene derivative containing from about 40% to about 70% chlorine which is used as the toxic ingredient of the insecticidal compositions of this invention is a chlorinated cyclic terpene alcohol, a chlorinated ester of a cyclic terpene alcohol, and an organic carboxylic acid having not more than seven carbon atoms in the molecule, or a chlorinated ether of at least one cyclic terpene alcohol having no more than 20 carbon atoms per molecule.

The cyclic terpene alcohols which are chlorinated to 40% to 70% chlorine for use in the insecticidal compositions of this invention are: borneol, isoborneol, fenchyl alcohols, isofenchyl alcohols, terpineols, terpinenols, menthol, carvomenthol, carveol, terpin-1,4, terpin-1,8, and the like. The bicyclic terpene alcohols which are chlorinated to 40% to 70% chlorine content are the most toxic of the chlorinated terpene alcohols. The position of the alcohol group is of less importance than the percentage chlorine in the molecule, but regardless of the position of the alcohol group in the molecule, the chlorinated cyclic terpene alcohols all possess insecticidal properties when made into the compositions of this invention. The oxygen analysis of the chlorinated cyclic terpene alcohols indicates that the oxygen is not lost in the chlorination process.

The chlorinated esters of cyclic terpene alcohols and organic carboxylic acids having not more than 7 carbon atoms are obtained by chlorination of the esters of the previously listed cyclic terpene alcohols. The organic acids which are combined with these alcohols to form these esters prior to chlorination are: the aliphatic acids, formic, acetic, propionic, butyric, isobutyric, valeric, hexanoic and heptanoic acids; the aromatic acids, benzoic acid, salicylic acid, and toluic acids; the dibasic acids, oxalic acid, maleic acid, succinic acid, glutaric acid, adipic acid, pimelic acid, phthalic acid and terephthalic acid; and the alicyclic acids, hexahydrobenzoic acid, tetrahydrobenzoic acid, hexahydrotoluic acid and tetrahydrotoluic acid; and chlorine-substituted acids which are derived from the above acids by chlorination. The chlorine in the chlorination process enters to a large extent the terpene alcohol part of the ester and those esters in which at least one-half of the chlorine content is in the terpene alcohol part of the chlorinated terpene ester are the most effective of the chlorinated cyclic terpene esters as insecticides. Esters of cyclic terpene alcohols and chlorinated organic acids are chlorinated to produce chlorinated esters of cyclic terpene alcohols and organic acids of this invention. The toxicity of such an ester is substantially nil until chlorine is substituted in the terpene part of the molecule and the toxicity becomes increasingly powerful at the percentage which corresponds to at least 20% chlorine in the terpene part of the molecule for a chlorinated cyclic terpene ester having at least 40% total chlorine in the molecule. The chlorinated cyclic terpene esters by analysis still contain oxygen.

The chlorinated ethers of cyclic terpene alcohols are ethers theoretically derived from one cyclic terpene alcohol and a nonterpenoid organic alcohol or ethers theoretically derived from two cyclic terpene alcohols or, in the case of the cineoles, internal ethers of one cyclic terpene alcohol. It is not intended to limit the ether to any particular method of its preparation. In the case of the mixed ethers, the organic alcohol portion is an alcohol having not more than 10 carbon atoms. The nonterpenoid alcohol portion of the ether may contain chlorine but at least one-half of the total chlorine in the product must be in the cyclic terpene alcohol part of the molecule. The cyclic terpene alcohols which form the ethers which are chlorinated for use in this invention are those listed above. The nonterpenoid alcohols which form the ethers with the terpene alcohols which are chlorinated are methyl alcohol, ethyl alcohol, propyl alcohol, isopropyl alcohol, butyl alcohols, amyl alcohols, hexyl alcohols, heptyl alcohols, octyl alcohols, nonyl alcohols, decyl alcohols, cyclohexanol, cyclopentanol, methyl cyclohexanol, and chlorine-substituted alcohols wherein the chlorine is less than that which would produce an ether of the cyclic terpene alcohol having more than about 20% chlorine in the ether which is to be chlorinated. Chlorinated ethers of cyclic terpene alcohols and nonterpenoid alcohols which have the highest toxicity have at least one-half of the necessary chlorine in the cyclic terpene alcohol part of the ether. The chlorinated cyclic terpene ethers having 40% to 70% total chlorine in the molecule still contain combined oxygen and are all effective in the insecticidal compositions of this invention.

Any of the chlorinated cyclic oxyterpene derivatives containing from about 40% to about 70% chlorine may be used as the toxic ingredient of the insecticidal compositions of this invention.

The chlorinated cyclic oxyterpene derivatives of this invention are of unknown structure in that the position of the chlorine atoms is unknown. However, the ring system of the cyclic terpenes is believed to remain unchanged. They are made by chlorination of the cyclic oxyterpene derivative under a wide range of chlorination conditions and the product is believed to be a mixture of chlorinated cyclic oxyterpene derivative isomers. Similar mixtures have been prepared under a wide range of chlorination conditions and the toxicity to flies has been found to be relatively independent of the method of chlorination, but to be dependent rather upon the degree of chlorination.

The chlorinated cyclic oxyterpene derivatives are prepared by chlorination of the cyclic oxyterpene derivative at a temperature below the decomposition point of the product. Most chlorinated cyclic oxyterpene derivatives tend to decompose at their boiling points and the chlorination is, therefore, carried out below the boiling temperature of the material being chlorinated. The temperature of chlorination is generally kept below about 150° C. and chlorination is ordinarily carried out above 0° C., since at low temperatures the rate of chlorination is impractically slow. The usual range of chlorination temperature is 50 to about 100° C. While initial stages of chlorination may be carried out at low temperatures, the final stages of chlorination should be carried out above 50° C. in order to reach a sufficiently high chlorine content to reach the desired toxicity.

The chlorination may be carried out in the presence or absence of catalysts but the reaction rate may become impractically slow, especially toward the end of the chlorination, in the absence of catalysts and catalysts are, therefore, generally used for practical operation. Light is one of the most satisfactory catalysts and this is preferably actinic light. It acts by accelerating the formation of free radicals. Other catalysts may also be used by adding them to the chlorination mixture either at the beginning, during the course of, or toward the end of the chlorination process. As catalysts, one may use iodine or one may use free radical formers such as lead alkyls or organic peroxides including peroxy acids and peroxy anhydrides including benzoyl peroxide and acetyl peroxide. Only a catalytic amount of catalyst is needed and, if used up in the process, more will be added as required. More than a catalytic amount will not ordinarily be added at one time since better control is obtained by using only as much as is necessary for attaining the desired rate of chlorination. The amount of catalyst used in the chlorination will ordinarily be within the range of about 0.001 to 5% based upon the chlorination mixture.

The chlorination is generally carried out in the liquid state. For instance, a volatile chlorinated solvent such as methylene chloride, chloroform, carbon tetrachloride, ethylene chloride, trichloroethane, tetrachloroethane, or pentachloroethane is generally used in order to maintain the liquid state and to reduce the viscosity sufficiently for good contact. Any well-known means of contacting the chlorine with the cyclic oxyterpene derivatives may be used. A satisfactory method involves dispersing chlorine gas in the liquid and relying on the flow of the gas for agitation. Auxiliary agitation may also be supplied. Since the reaction is ordinarily carried out at atmospheric pressure, the solvent is chosen according to its boiling point so that the refluxing solvent can provide a satisfactory means of temperature control. When a solvent is used, the amount ordinarily is kept below about 20 volumes per volume of cyclic oxyterpene derivatives being chlorinated and is generally within the range of 1–5 volumes per volume of cyclic oxyterpene derivative. The chlorine is supplied to the reaction mixture at a rate substantially equal to that at which it is consumed in the reaction.

The chlorinated cyclic oxyterpene derivatives may be readily purified and freed of catalysts by washing with water until sufficiently free of hydrochloric acid and then washing with mild alkali until neutral. The catalysts are ordinarily completely removed by this procedure. After purification, the solvent is removed by distillation, preferably under reduced pressure.

The insecticidal compositions of this invention are produced by admixing the chlorinated cyclic oxyterpene derivative having a chlorine content within the range of about 40% to about 70% with a suitable adjuvant which is an inert material to facilitate the mechanical distribution of the chlorinated cyclic oxyterpene derivative toxicant. Inert materials to facilitate the mechanical distribution of the toxicant are added for the purposes outlined in Frear (Chemistry of Insecticides, Fungicides, and Herbicides by Donald E. H. Frear, second edition, 1948, page 5) to form sprays, dusts, and aerosols from the chlorinated cyclic oxyterpene derivative. Surface-active dispersing agents are used in admixture with the chlorinated cyclic oxyterpene derivative to promote the spreading of the toxic material so as to improve its effectiveness. They are used in both aqueous sprays and dusts. Hydrocarbon solvents such as deodorized kerosene are also used in sprays as the sole inert material to facilitate the mechanical distribution of the toxicant.

Suitable surface-active dispersing agents for use in the compositions of this invention are those disclosed in Chemistry of Insecticides, Fungicides, and Herbicides (l. c., pages 280–287) for use with known insecticides and include soaps of resin, alginic and fatty acids and alkali metals or alkali amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the chlorinated cyclic oxyterpene derivative toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents. Thus the chlorinated cyclic oxyterpene derivative mixtures admixed with these inert materials which facilitate the mechanical distribution of the chlorinated cyclic oxyterpene derivative in accordance with this invention are those containing the above-listed surface-active dispersing agents and hydrocarbon solvent dispersing agents.

The amount of chlorinated cyclic oxyterpene derivative in the composition with the inert material which facilitates the mechanical distribution of the toxicant will depend upon the type of inert material and the use to which it is to be put. The compositions will generally contain less than about 30% chlorinated cyclic oxyterpene derivative. Agricultural dusts will generally contain 10–30% chlorinated cyclic oxyterpene derivative. Household sprays will contain from 0.1 to 10% chlorinated cyclic oxyterpene derivative. Agricultural sprays will, likewise, contain 0.1 to 10% of the chlorinated cyclic oxyterpene derivative. Aqueous emulsions will contain sufficient surface-active dispersing agent to maintain an emulsion of the chlorinated cyclic oxyterpene derivative during the spraying process.

For many purposes it may be desirable to use the chlorinated cyclic oxyterpene derivative in combination with other insecticidal toxicants. Many toxicants have a very high knockdown in relatively dilute solutions, but higher concentrations must be used in order to obtain the desired degree of kill. Due to the very high degree of killing power which the chlorinated cyclic oxyterpene derivatives possess, these compounds may be added to such toxicants, thereby enabling the use of much more dilute solutions than would otherwise be possible. Toxicants with which these chlorinated cyclic oxyterpene derivatives may be combined include such compounds as rotenone, pyrethrum, and organic thiocyanates such as alkyl thiocyanates, thiocyanoethers such as $\beta$-butoxy-$\beta'$-thiocyanoethyl ether, and terpene thiocyanoacylates such as isobornyl thiocyanoacetate, fenchyl thiocyanoacetate, isobornyl $\alpha$-thiocyanopropionate, etc.

The insecticidal compositions of this invention are useful in combatting flies, mosquitoes, roaches moths, carpet beetles, bedbugs, boll weevils, boll worms, army worms, and grasshoppers and many other pests.

This application is a continuation-in-part of application Serial Number 676,592, filed June 13, 1946, now abandoned.

What I claim and desire to protect by Letters Patent is:

1. An insecticidal composition comprising the product of chlorination in an inert solvent with chlorine gas in the presence of a free radical-forming chlorination catalyst at a temperature in the range of about 50° C. to about 150° C. to a chlorine content of about 40–70% of an oxyterpene material of the group consisting of isobornyl acetate, isobornyl chloroacetate, isobornyl propionate, bornyl salicylate, fenchyl alcohol, isoborneol and terpinyl chloroethyl ether and an insecticidal adjuvant as a carrier therefor.

2. An insecticidal composition comprising the product of chlorination of isobornyl acetate in an inert solvent with chlorine gas in the presence of a free radical-forming chlorination catalyst at a temperature in the range of about 50° C. to about 150° C. to a chlorine content of about 40–70% and an insecticidal adjuvant as a carrier therefor.

3. An insecticidal composition comprising the product of chlorination of isobornyl chloroacetate in an inert solvent with chlorine gas in the presence of a free radical-forming chlorination catalyst at a temperature in the range of about 50° C. to about 150° C. to a chlorine content of about 40–70% and an insecticidal adjuvant as a carrier therefor.

4. An insecticidal composition comprising the product of chlorination of isoborneol in an inert solvent with chlorine gas in the presence of a free radical-forming chlorination catalyst at a temperature in the range of about 50° C. to about 150° C. to a chlorine content of about 40–70% and an insecticidal adjuvant as a carrier therefor.

5. An insecticidal composition comprising the product of chlorination of terpinyl $\beta$-chloroethyl ether in an inert solvent with chlorine gas in the presence of a free radical-forming chlorination catalyst at a temperature in the range of about 50° C. to about 150° C. to a chlorine content of about 40–70% and an insecticidal adjuvant as a carrier therefor.

WILLIAM D. STONECIPHER.

References Cited in the file of this patent

UNITED STATES PATENTS

| Number | Name | Date |
|---|---|---|
| 1,755,178 | Grant | Apr. 22, 1930 |
| 2,160,579 | Thompson, Jr. | May 30, 1939 |
| 2,227,058 | Borglin | Dec. 31, 1940 |
| 2,347,929 | Borglin | May 2, 1944 |
| 2,565,471 | Buntin | Aug. 28, 1951 |
| 2,579,300 | Buntin | Dec. 18, 1951 |

OTHER REFERENCES

Parker et al., University of Delaware Agr. Expt. Station Bulletin Number 264, Tech. No. 36, entitled, "Toxaphene, a Chlorinated Hydrocarbon with Insecticidal Properties," February 1947.

Desalbres et al., Chimie and Industrie, Volume 58, Number 5, November 1947, pages 443 to 448.